(12) United States Patent  (10) Patent No.: US 7,396,137 B2
Lim  (45) Date of Patent: Jul. 8, 2008

(54) PROJECTOR

(75) Inventor: Seon-woo Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 339 days.

(21) Appl. No.: 10/985,975

(22) Filed: Nov. 12, 2004

(65) Prior Publication Data

US 2005/0105064 A1    May 19, 2005

(30) Foreign Application Priority Data

Nov. 13, 2003   (KR) ...................... 10-2003-0080074

(51) Int. Cl.
G03B 21/22 (2006.01)
F16M 11/24 (2006.01)
F16M 7/00 (2006.01)

(52) U.S. Cl. ................ 353/119; 353/122; 248/188.2; 248/409; 248/649; 248/655; 248/677

(58) Field of Classification Search ................ 353/119, 353/69, 70, 122; 248/188.2, 188.3, 188.5, 248/408, 409, 423, 649, 655, 677, 188.8; 348/739, 744, 789
See application file for complete search history.

(56) References Cited

U.S. PATENT DOCUMENTS 6,793,348 B2 * 9/2004 Lee et al. ...................... 353/119
6,923,417 B2 * 8/2005 Chang ........................ 248/649
2002/0113951 A1 * 8/2002 Huang et al. ................. 353/119
2002/0140909 A1   10/2002 Tanaka ......................... 353/70
2003/0106972 A1   6/2003 Hsu et al. ................. 248/188.2
2003/0147056 A1   8/2003 Liu ............................. 353/119
2003/0227601 A1 * 12/2003 Chang ........................ 353/119

FOREIGN PATENT DOCUMENTS

| JP | 9-54370 | 2/1997 |
| JP | 11-248089 | 9/1999 |
| JP | 11-271879 | 10/1999 |
| JP | 2000-338598 | 12/2000 |
| KR | 96-33039 | 10/1996 |
| KR | 1997-026295 | 6/1997 |
| KR | 1998-019520 | 7/1998 |
| KR | 1998-019521 | 7/1998 |
| KR | 131050 | 9/1998 |
| KR | 2002-0008921 | 2/2002 |
| TW | 535484 | 6/2003 |

OTHER PUBLICATIONS

Supplementary European Search Report, mailed Dec. 27, 2006 and issued in corresponding European Patent Application No. 04800044.2-2217.

* cited by examiner

*Primary Examiner*—Rochelle-Ann Blackman
(74) *Attorney, Agent, or Firm*—Staas & Halsey LLP (57) ABSTRACT

A projector including a main body and a height adjuster in a bottom of the main body. The height adjuster includes a guide housing connected to the bottom of the main body; a front leg slidably accommodated in the guide housing; a spring between the guide housing and the front leg and providing elasticity to support a weight of the main body; and a stopper to prevent the front leg from separating from the guide housing.

23 Claims, 5 Drawing Sheets

PROJECTOR

CROSS-REFERENCE TO RELATED APPLICATIONS

This application claims the benefit of Korean Patent Application No. 2003-80074, filed Nov. 13, 2003, in the Korean Intellectual Property Office, the disclosure of which is incorporated herein by reference.

BACKGROUND OF THE INVENTION

1. Field of the Invention

The present invention relates to a projector projecting an image onto a screen, and more particularly, to a projector including a height adjuster to adjust a projecting angle of the projector.

2. Description of the Related Art

Generally, a projector includes an optical system including a display element, and a light source to emit light toward the optical system, and projects an image created by the display element onto a screen. The projector is classified into a transmission-type projector or a reflection-type projector according to the method of creating the image. The transmission-type projector projects an image onto the screen with the light transmitted through the display element, and the reflection-type projector projects an image onto the screen with the light reflected from the display element.

Further, the projector is generally seated on a flat surface such as a table and projects an image onto the screen through a projection lens provided in a front of the projector. Therefore, to adjust a projecting angle of the projection lens relative to the screen, there is needed a height adjuster to adjust the height of the front of a projector main body.

In a conventional projector, the height adjuster includes a front leg provided in a front bottom of the projector main body and to support the projector main body, and a screw thread formed in the front leg. Hence, the height of the projector is adjusted through a pitch of the screw thread formed in the front leg.

However, in the conventional projector, a user must raise the projector and then turn the front leg to adjust the height of the front of the projector main body, which is inconvenient for the user.

SUMMARY OF THE INVENTION

Accordingly, it is an aspect of the present invention to provide a projector having an improved structure to easily adjust the height of the front of a projector main body to adjust a projecting angle of the projector which projects an image onto a screen.

Additional aspects and/or advantages of the invention will be set forth in part in the description which follows and, in part, will be obvious from the description, or may be learned by practice of the invention.

The foregoing and/or other aspects of the present invention are achieved by providing a projector including a projector main body; and a height adjuster provided in a bottom of the projector main body, including a guide housing connected to the bottom of the projector main body, a front leg slidably accommodated in the guide housing, an elastic member provided between the guide housing and the front leg and providing elasticity to support a weight of the projector main body, and a stopper to prevent the front leg from separating from the guide housing.

According to an aspect of the invention, the projector further includes a guide rail on an inside wall of the guide housing; and a slider on the front leg and slidably engaged with the guide rail.

According to an aspect of the invention, the guide housing includes a wall and the stopper includes a guide slot formed in the wall of the guide housing; and a screw connected to the front leg via the guide slot.

According to an aspect of the invention, the projector further includes a through hole formed in the front leg in a horizontal direction at a part of the front leg which is exposed to an outside from the guide housing; and a leg reinforcing shaft rotatably inserted in the through hole.

According to an aspect of the invention, the projector further includes absorbers including elastic material on opposite sides of the leg reinforcing shaft.

According to an aspect of the invention, the projector further includes a pair of rear legs supporting a rear part of the projector main body, wherein one of the pair of rear legs includes a screw thread to adjust a height of the projector main body.

According to an aspect of the invention, the elastic member includes a flat spring which is provided between the front leg and the guide housing and has a first end coupled to the guide housing and a second end elastically rolled and released above the front leg and accommodated in the guide housing.

According to an aspect of the invention, the projector further includes a spring guide provided above the front leg accommodated in the guide housing and to guide the flat spring.

According to an aspect of the invention, the projector further includes a guide rail on an inside wall of the guide housing; and a sliding shaft provided on opposite sides of the spring guide and slidably guided along the guide rail.

BRIEF DESCRIPTION OF THE DRAWINGS

These and/or other aspects and advantages of the present invention will become apparent and more readily appreciated from the following description of the embodiment, taken in conjunction with the accompanying drawings of which.

DETAILED DESCRIPTION OF THE PREFERRED EMBODIMENT

Reference will now be made in detail to the embodiment of the present invention, an example of which is illustrated in the accompanying drawings, wherein like reference numerals refer to like elements throughout. The embodiment is described below in order to explain the present invention by referring to the figures.

Figure 1:
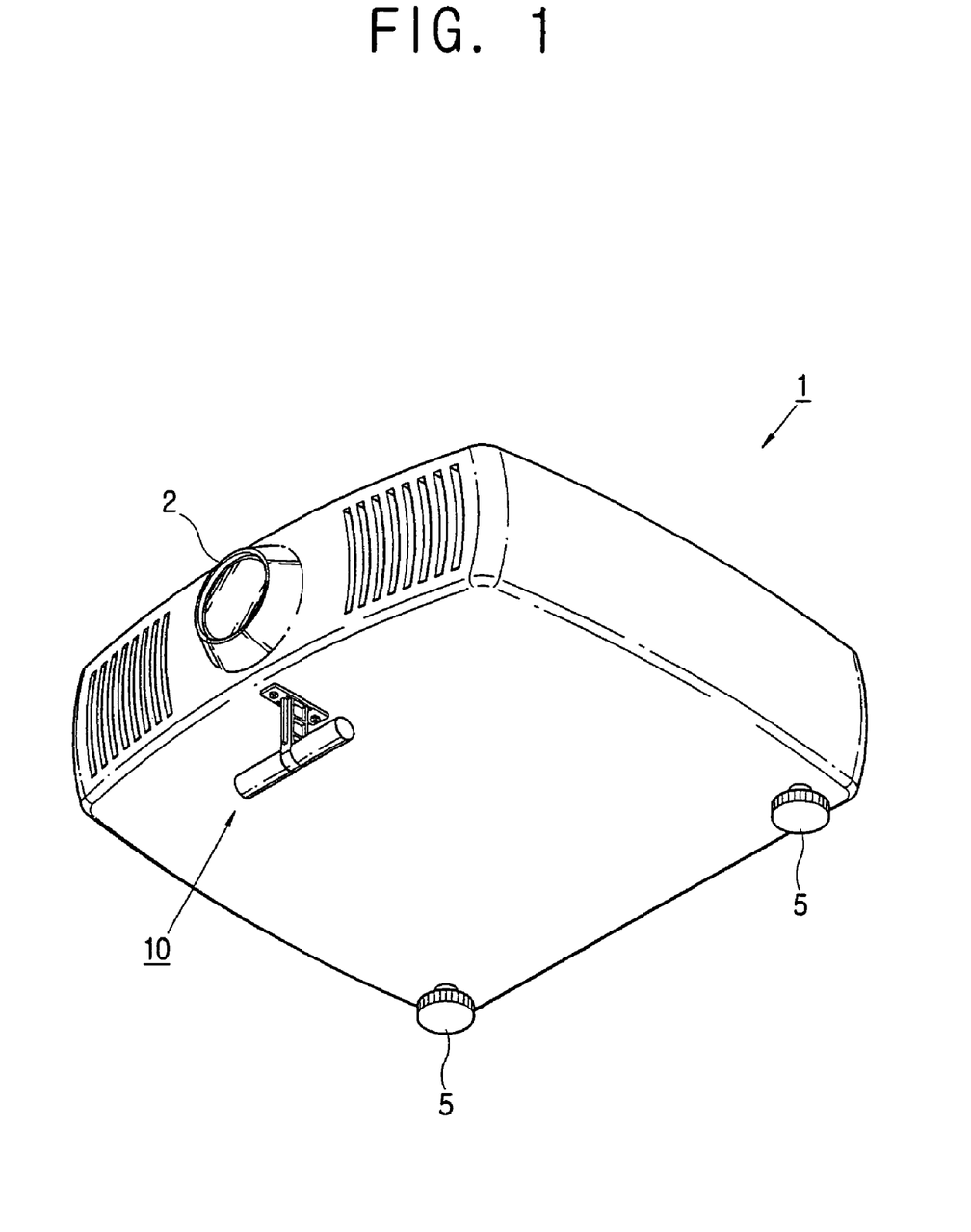
FIG. 1 is a perspective view of a projector according to an embodiment of the present invention.

As shown in FIG. 1, a projector according to an embodiment of the present invention includes a projector main body 1 having a projection lens 2 provided in the front of the projector main body 1 and through which an image is projected onto a screen, a pair of rear legs 5 to support the projector main body 1, and a height adjuster 10 to support the projector main body 1 and adjust the height of the front of the projector main body 1.

Figure 2:
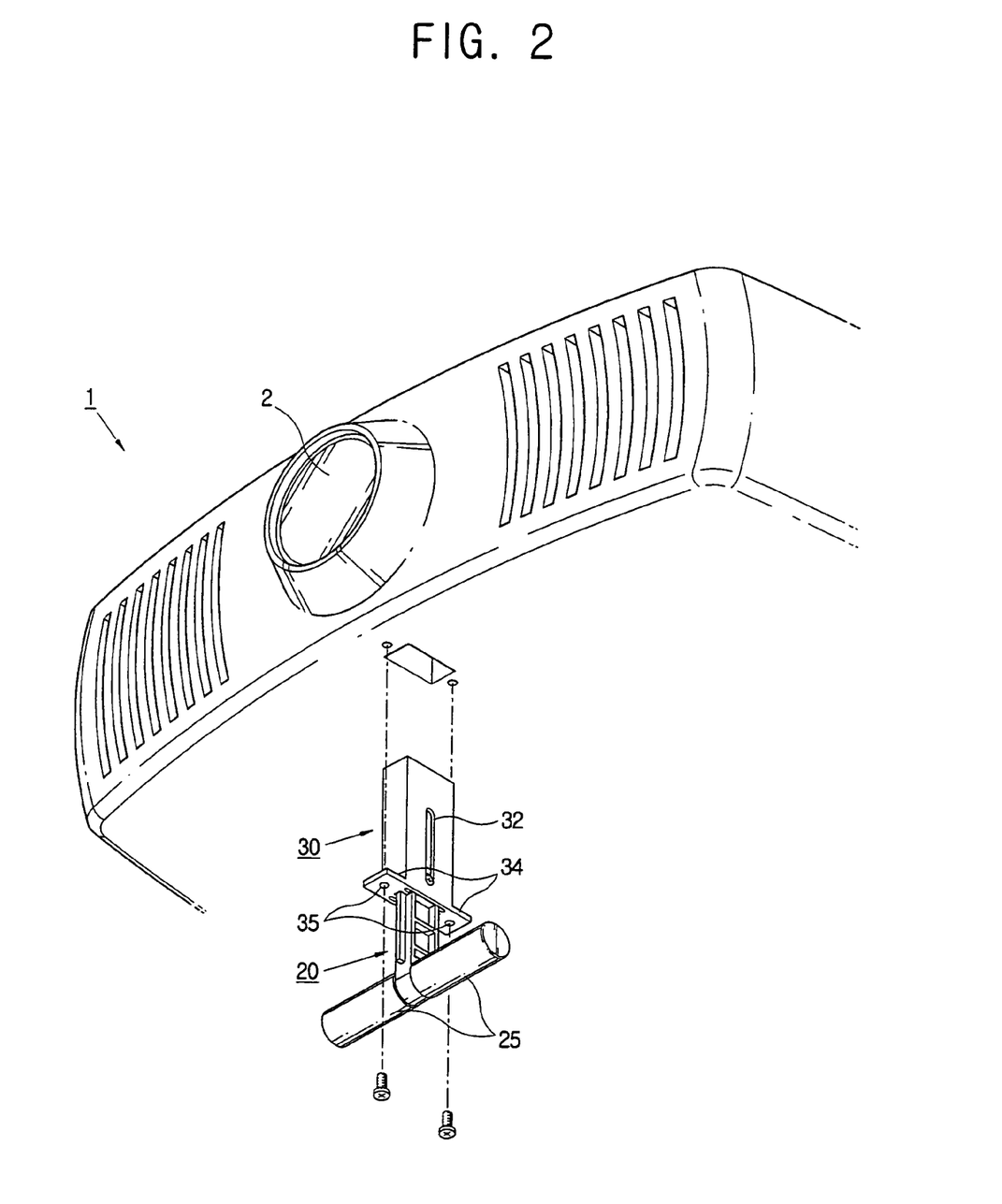
FIG. 2 is a perspective view of a height adjuster of the projector of FIG. 1.
Figure 3:
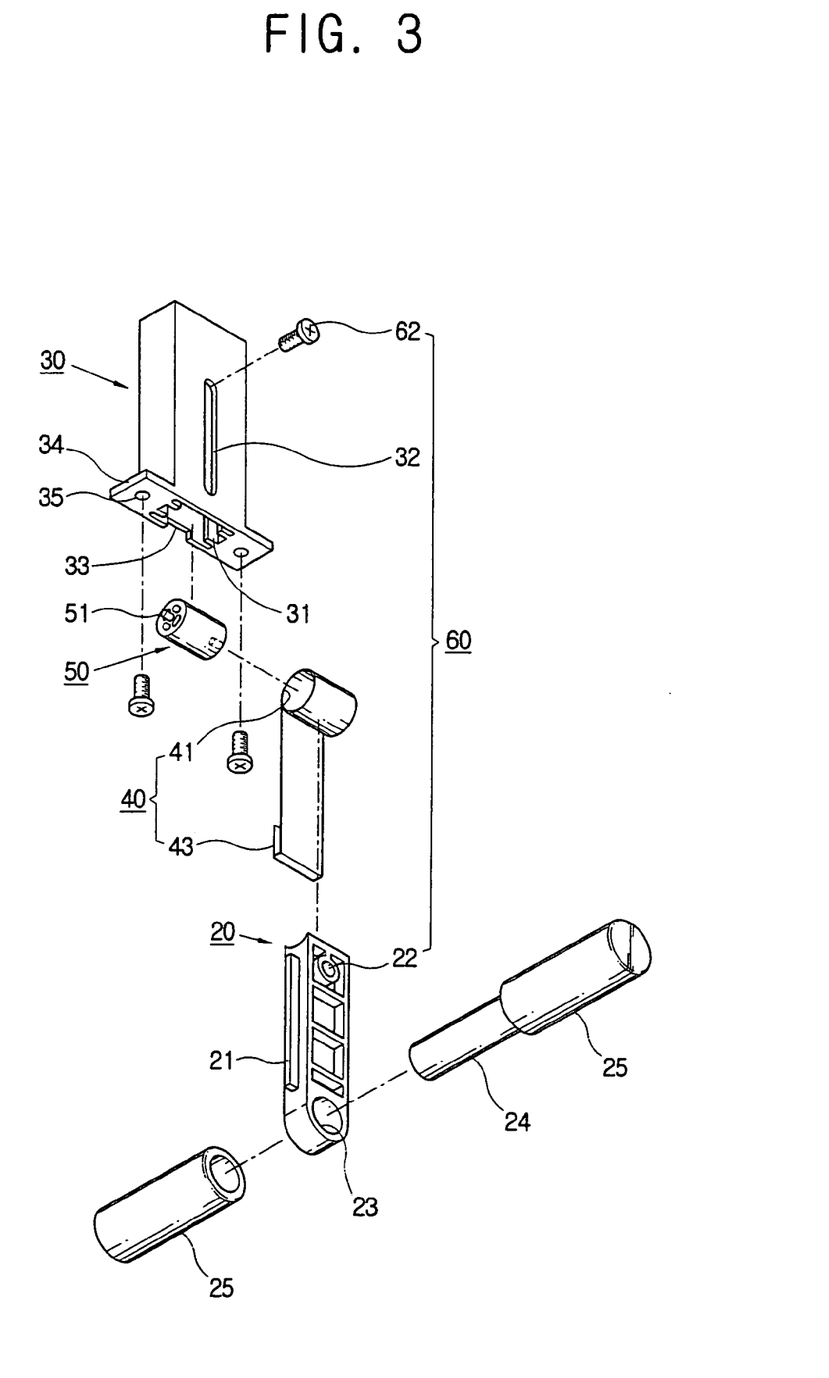
FIG. 3 is an exploded perspective view of the height adjuster of FIG. 2.

The height adjuster 10 is, as shown in FIG. 2, provided in a front bottom of the projector main body 1. As shown in FIG. 3, the height adjuster 10 includes a guide housing 30 connected to the front bottom of the projector main body 1, a front leg 20 slidably accommodated in the guide housing 30, an elastic member 40 (for example, a spring) provided between the guide housing 30 and the front leg 20 and to provide elasticity to support a weight of the projector main body 1, and a stopper 60 to prevent the front leg 20 from separating from the guide housing 30.

The guide housing 30 is inserted in and connected to the front bottom of the projector main body 1, wherein the guide housing 30 includes a flange 34 formed with a screw hole 35 to be connected to the projector main body 1. On an inside wall of the guide housing 30 are provided a guide rail 31 to slidably support and accommodate the front leg 20, and an elastic member coupling part 33 to which a first end of the elastic member 40 is coupled.

The elastic member 40 is provided between the front leg 20 and the guide housing 30 and may be a flat spring including a clip part 43 coupled to the elastic member coupling part 33 of the guide housing 30, and a rolling part 41 positioned above the front leg 20 accommodated in the guide housing 30 and providing the elasticity.

Further, an elastic member guide 50 is provided above the front leg 20 accommodated in the guide housing 30 to guide the rolling part 41 of the elastic member 40 to be rolled and released. Thus, the elastic member 40 is rolled and released by the elastic member guide 50, keeping its elasticity stable.

Further, a sliding shaft 51 is provided in opposite sides of the elastic member guide 50, and is slidably guided along the guide rail 31 of the guide housing 30. Thus, the elasticity of the elastic member 40 is stably transmitted to the front leg 20.

Figure 4:
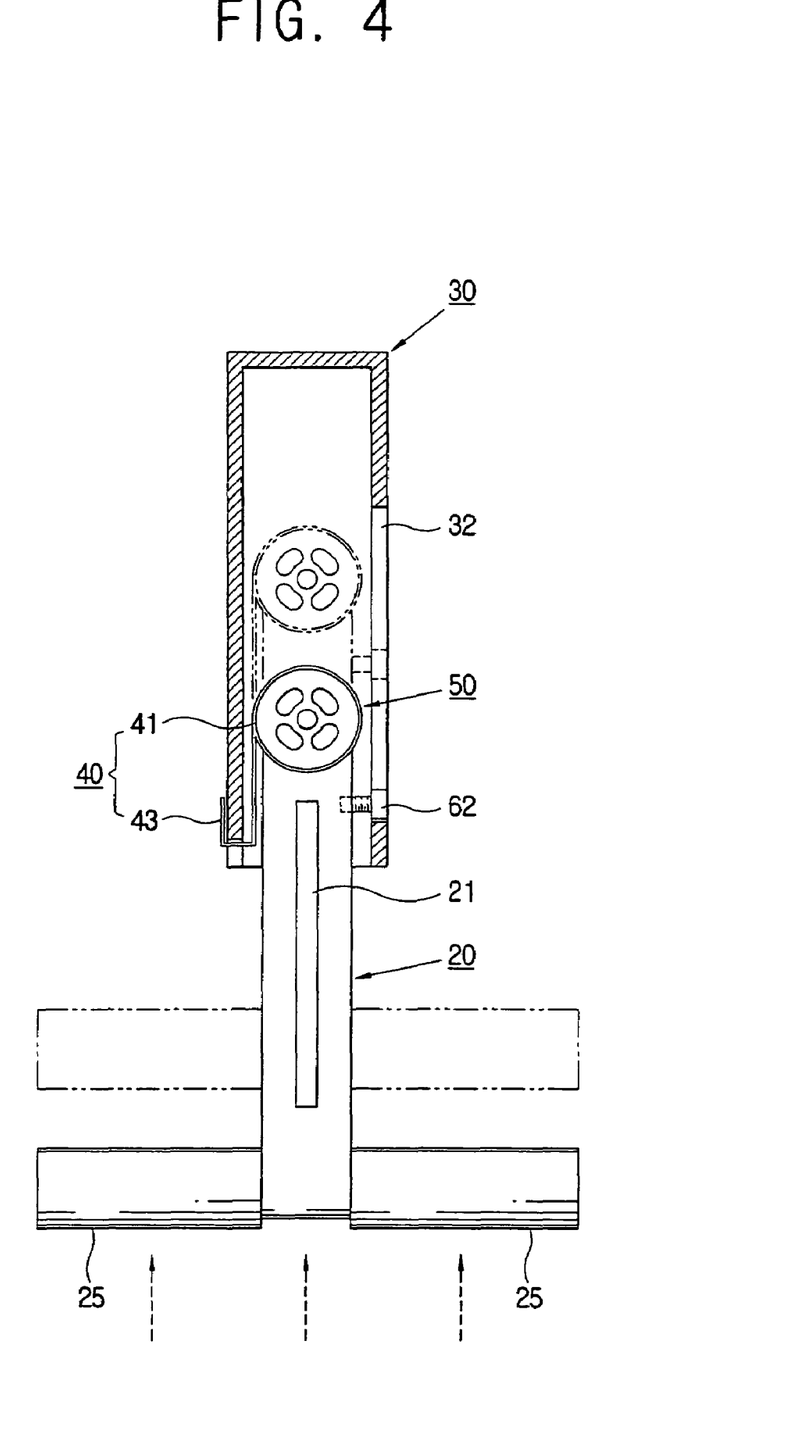
FIGS. 4 and 5 illustrate operations of the height adjuster according to the embodiment of the present invention.
Figure 5:
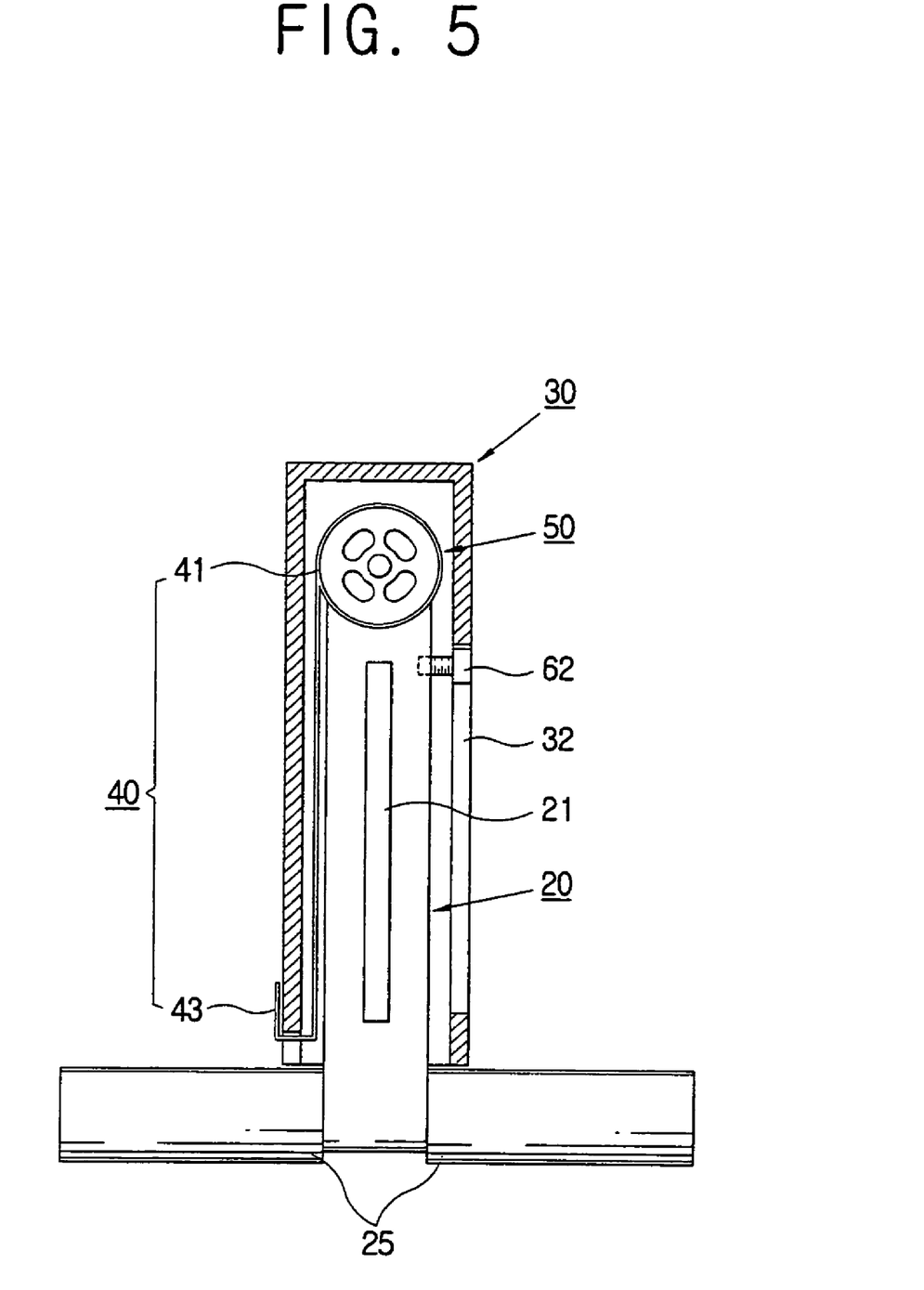

While the height of the front of the projector main body 1 is adjusted, the elastic member 40 is operated as follows. As shown in FIGS. 4 and 5, the elasticity of the elastic member 40 supports the weight of the projector main body 1. That is, the elasticity of the elastic member 40 is approximately counterbalanced with the weight of the projector main body 1, so that the front of the projection main body 1 stays at the adjusted height when a user finishes adjusting the height of the front of the projector main body 1 as desired.

In the foregoing embodiment, a flat spring 40 is employed as the elastic member 40 providing the elasticity between the guide housing 30 and the front leg 20. However, a coil spring or other elastic member may be provided between the guide housing 30 and the front leg 20.

Meanwhile, the front leg 20 includes a slider 21 slidably engaged with the guide rail 31 of the guide housing 30, a first part partially accommodated in the guide housing 30, and a second part formed with a through hole 23 in a horizontal direction. The front leg 20 includes a leg reinforcing shaft 24 being rotatably inserted in the through hole 23 of the front leg 20. Further, opposite parts of the leg reinforcing shaft 24 are covered with an absorber 25 made of elastic material.

Thus, the leg reinforcing shaft 24 rotatably coupled to the front leg 20 freely rotates against the seating surface. Therefore, when the front leg 20 is tilted due to the rotation of the projector main body 1 about the rear legs 5 as the height of the front of the projector main body 1 is adjusted through the front leg 20 in the state that the rear legs 5 are already seated, the leg reinforcing shaft 24 accordingly rotates against the seating surface, so that the front leg 20 can be easily tilted against the seating surface. Further, the absorbers 25 coupled to the opposite parts of the leg reinforcing shaft 24 absorb a shock and stably support the projector main body 1.

The stopper 60 includes a guide slot 32 formed in one wall of the guide housing 30 with a predetermined length, a screw groove 22 formed in the front leg 20 at a position corresponding to the guide slot 32, and a screw 62 inserted in the screw groove 22 of the front leg 20 via the guide slot 32 of the guide housing 30. Thus, extension and retraction of the front leg 20 are restricted within the length of the guide slot 32 formed in the guide housing 30.

On the other hand, at least one of the pair of rear legs 5 is formed with a screw thread (not shown) to adjust the height. Hence, when the seating surface for the projector is inclined or uneven, the projector is stably seated by adjusting the height of the adjustable rear leg 5.

With this configuration, the projector according to the embodiment of the present invention is operated as follows. First, the projector is seated on the seating surface such as a table, wherein the projector main body 1 is adjusted to be evenly seated by turning the height adjustable rear leg 5 in consideration of an inclination and an evenness of the seating place. Then, the projecting angle of the projector is adjusted to project the image onto the screen by adjusting the height of the front of the projector main body 1 through the front leg 20. At this time, the elasticity of the elastic member 40 is approximately counterbalanced with the weight of the projector main body 1, so that the front of the projector main body 1 stays at the adjusted height. This counterbalancing occurs at any adjusted height of the projector main body 1.

Thus, a user can easily adjust the projecting angle of the projector projecting an image onto the screen.

As described above, the embodiment of the present invention provides a projector having an improved structure to easily adjust the height of the front of a projector main body so as to adjust a projecting angle of the projector projecting an image onto a screen.

Although an embodiment of the present invention has been shown and described, it will be appreciated by those skilled in the art that changes may be made in this embodiment without departing from the principles and spirit of the invention, the scope of which is defined in the appended claims and their equivalents.

What is claimed is:

1. A projector, comprising:
a projector main body;
a height adjuster provided in a bottom of the projector main body, comprising:
a guide housing connected to the bottom of the projector main body,
a front leg slidably accommodated in the guide housing,
an elastic member provided between the guide housing and the front leg and providing elasticity to support a weight of the projector main body, and
a stopper to prevent the front leg from separating from the guide housing; and
a through hole formed in the front leg in a horizontal direction at a part of the front leg which is exposed to an outside from the guide housing.

2. The projector according to claim 1, further comprising:
a guide rail on an inside wall of the guide housing; and
a slider on the front leg and slidably engaged with the guide rail.

3. The apparatus according to claim 2, further comprising an elastic member coupling unit on the inside wall of the guide housing and coupled to the elastic member.

4. The projector according to claim 1, wherein the guide housing comprises a wall and the stopper comprises:
a guide slot formed in the wall of the guide housing; and
a screw connected to the front leg via the guide slot.

5. The projector according to claim 1, further comprising a pair of rear legs supporting a rear part of the projector main body,
   wherein one of the pair of rear legs comprises a screw thread to adjust a height of the projector main body.

6. A projector, comprising:
   a projector main body;
   a height adjuster provided in a bottom of the projector main body, comprising:
      a guide housing connected to the bottom of the projector main body,
      a front leg slidably accommodated in the guide housing,
      an elastic member provided between the guide housing and the front leg and providing elasticity to support a weight of the projector main body;
   a stopper to prevent the front leg from separating from the guide housing;
   a guide rail on an inside wall of the guide housing;
   a slider on the front leg and slidably engaged with the guide rail;
   a through hole formed in the front leg in a horizontal direction at a part of the front leg which is exposed to an outside from the guide housing; and
   a leg reinforcing shaft rotatably inserted in the through hole.

7. The projector according to claim 6, further comprising absorbers comprising elastic material on opposite sides of the leg reinforcing shaft.

8. The projector according to claim 7, wherein the elastic member comprises a flat spring which is provided between the front leg and the guide housing and has a first end coupled to the guide housing and a second end elastically rolled and released above the front leg and accommodated in the guide housing.

9. The projector according to claim 8, further comprising a spring guide provided above the front leg accommodated in the guide housing and to guide the flat spring to be rolled and released.

10. The projector according to claim 9, further comprising:
   a guide rail wall of the guide housing; and
   a sliding shaft provided on opposite sides of the spring guide and slidably guided along the guide rail.

11. The projector according to claim 6, wherein the elastic member comprises a flat spring which is provided between the front leg and the guide housing and has a first end coupled to the guide housing and a second end elastically rolled and released above the front leg and accommodated in the guide housing.

12. The projector according to claim 11, further comprising a spring guide provided above the front leg accommodated in the guide housing and to guide the flat spring.

13. The projector according to claim 12, further comprising:
   a guide rail wall of the guide housing; and
   a sliding shaft provided on opposite sides of the spring guide and slidably guided along the guide rail.

14. A projector, comprising:
   a projector main body; and
   a height adjuster provided in a bottom of the projector main body, comprising:
      a guide housing connected to the bottom of the projector main body,
      a front leg slidably accommodated in the guide housing,
      an elastic member provided between the guide housing and the front leg and providing elasticity to support a weight of the projector main body, and
      a stopper to prevent the front leg from separating from the guide housing,
   wherein the guide housing comprises a wall and the stopper comprises:
      a guide slot formed in the wall of the guide housing, and
      a screw connected to the front leg via the guide slot and
   wherein the elastic member comprises a flat spring which is provided between the front leg and the guide housing and has a first end coupled to the guide housing and a second end elastically rolled and released above the front leg and accommodated in the guide housing.

15. The projector according to claim 14, further comprising a spring guide provided above the front leg accommodated in the guide housing and to guide the flat spring.

16. The projector according to claim 15, further comprising:
   a guide rail wall of the guide housing; and
   a sliding shaft provided on opposite sides of the spring guide and slidably guided along the guide rail.

17. A projector, comprising:
   a projector main body;
   a height adjuster provided in a bottom of the projector main body, comprising:
      a guide housing connected to the bottom of the projector main body,
      a front leg slidably accommodated in the guide housing,
      an elastic member provided between the guide housing and the front leg and providing elasticity to support a weight of the projector main body, and
   a stopper to prevent the front leg from separating from the guide housing.
   a guide rail on an inside wall of the guide housing;
   a slider on the front leg and slidably engaged with the guide rail; and
   an elastic member coupling unit on the inside wall of the guide housing and coupled to the elastic member,
   wherein the elastic member comprises:
      a clip coupled to the elastic member coupling unit; and
      a rolling part accommodated in the guide housing.

18. A projection apparatus, comprising:
   a main body to project an image;
   an adjuster to slide relative to the main body to thereby adjust a height of the main body,
   wherein the adjuster comprises:
      a housing in the main body,
      a leg slidably accommodated in the housing to contact a surface to support the apparatus, and
      an elastic member between the leg and the housing, an elasticity of the elastic member to counterbalance a weight of the main body; and
   a through hole formed in the leg in a horizontal direction at a part of the leg which is exposed to an outside from the housing.

19. The apparatus according to claim 18, wherein the main body comprises a lens.

20. The apparatus according to claim 18, wherein the elastic member is a flat spring.

21. A projector, comprising:
   a main body; and
   a height adjuster, comprising:
      a slide unit slidably accommodated in the main body, and
      an elastic member between the slide unit and the main body, an elasticity of the elastic member to counterbalance a weight of the main body,
   a height of the main body being adjusted by sliding the slide unit relative to the main body, wherein the elastic member comprises a flat spring which has an end that elastically rolls according to the weight of the main body.

22. A method comprising:

providing an apparatus to project an image, comprising a main body and a height adjuster, the height adjuster comprising a leg within a guide housing;

supporting the apparatus, comprising contacting the height adjuster with a support surface;

adjusting a height of the main body relative to the support surface, comprising moving the leg within the guide housing while maintaining the contact of the height adjuster with the support surface; and counterbalancing a weight of the main body using an elasticity of an elastic member, wherein the elastic member comprises a flat spring which has an end that elastically rolls according to the weight of the main body.

23. A projector, comprising:

a main body;

a height adjuster, comprising a housing and a leg inside the housing; and an elastic member between the leg and the housing,
the height adjuster to adjust a height of the main body while an elasticity of the elastic member counterbalances a weight of the main body, wherein the elastic member comprises a flat spring which has an end that elastically rolls according to the weight of the main body.

* * * * *

UNITED STATES PATENT AND TRADEMARK OFFICE
CERTIFICATE OF CORRECTION

PATENT NO. : 7,396,137 B2  Page 1 of 1
APPLICATION NO. : 10/985975
DATED : July 8, 2008
INVENTOR(S) : Seon-woo Lim

It is certified that error appears in the above-identified patent and that said Letters Patent is hereby corrected as shown below:

Column 5, Line 57, change "projector,comprising:" to --projector, comprising:--.

Column 6, Line 31, change "housing." to --housing;--.

Signed and Sealed this

Eighteenth Day of November, 2008

JON W. DUDAS
*Director of the United States Patent and Trademark Office*